United States Patent [19]

McMurray

[11] 4,220,188
[45] Sep. 2, 1980

[54] LOCKING FASTENER

[75] Inventor: John C. McMurray, Painesville, Ohio

[73] Assignee: Russell, Burdsall & Ward Corporation, Mentor, Ohio

[21] Appl. No.: 923,330

[22] Filed: Jul. 10, 1978

[51] Int. Cl.² .................................. F16B 39/282
[52] U.S. Cl. .............................................. 151/37
[58] Field of Search .......................... 151/37, 35, 34

[56] References Cited

U.S. PATENT DOCUMENTS

| 2,959,204 | 11/1960 | Rigot | 151/37 |
| 4,094,352 | 6/1978 | Hlinsky | 151/37 |

FOREIGN PATENT DOCUMENTS

| 2315628 | 1/1977 | France | 151/37 |
| 1444075 | 7/1976 | United Kingdom | 151/37 |

Primary Examiner—Ramon S. Britts
Attorney, Agent, or Firm—Pearne, Gordon, Sessions

[57] ABSTRACT

A self locking threaded fastener is disclosed wherein the self locking system includes a plurality of bearing surfaces contained within a bearing plane and positioned in an annulus around the thread means. Extending inwardly from each bearing surface is a ramp surface which is inclined inwardly and back from the bearing plane. An axially extending shoulder joins one edge of each ramp surface. When the fastener is tightened against a mating part to clamp such part, the engagement causes sufficient pressure to displace material of the mating part by cold flow or other type of displacement into the recesses between the ramp surfaces and shoulders. Continued tightening rotation does not encounter excessive torque since the ramp surfaces provide a camming action but loosening rotation is resisted by the interference between the displaced material and the shoulders. As displacement occurs, additional portions of the ramp surface engages displaced material to increase the effective bearing area and locking interference and provide a self limiting action with respect to the extent the fastener embeds in the mating surface.

16 Claims, 9 Drawing Figures

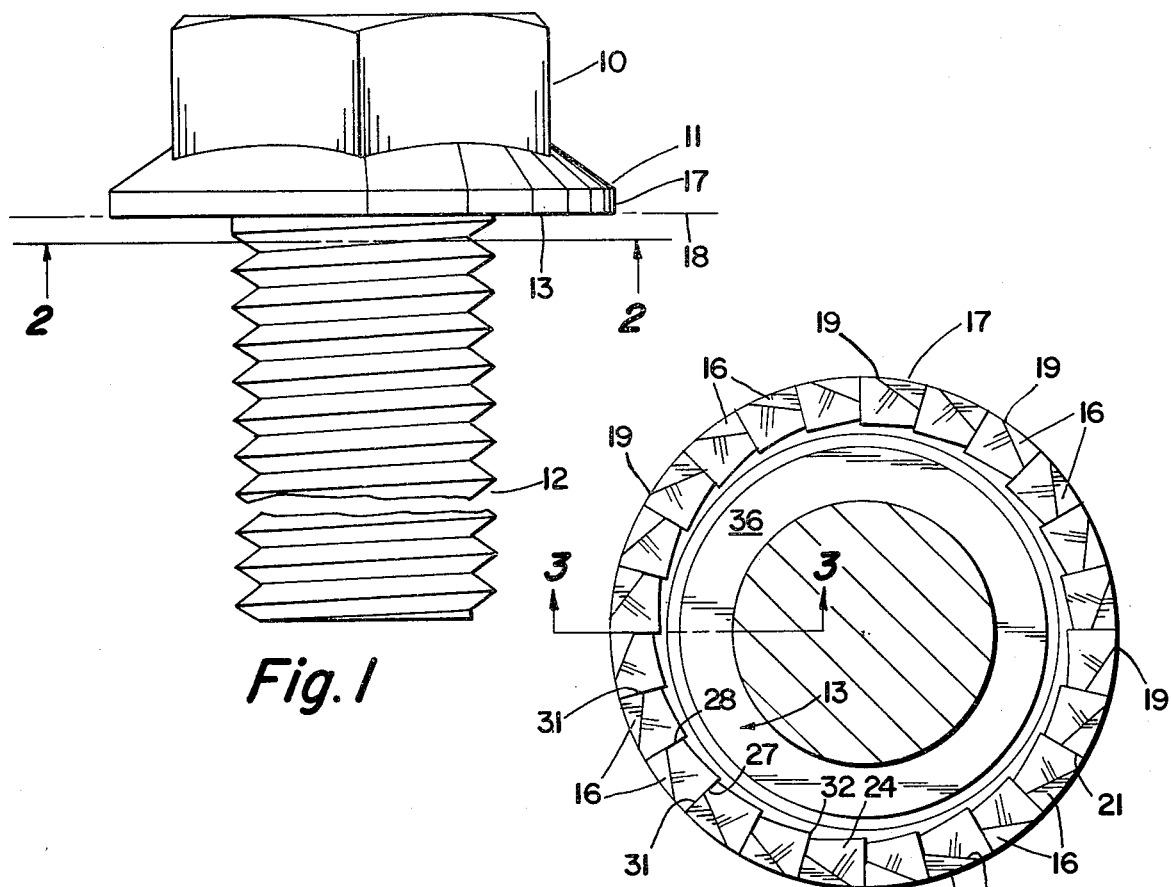
Fig. 1
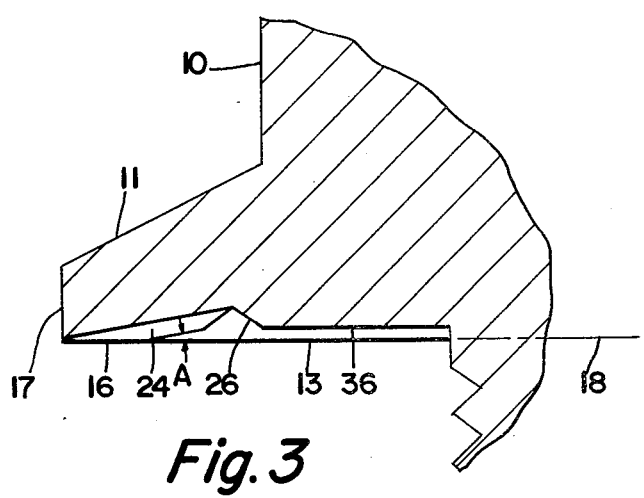
Fig. 2
Fig. 3
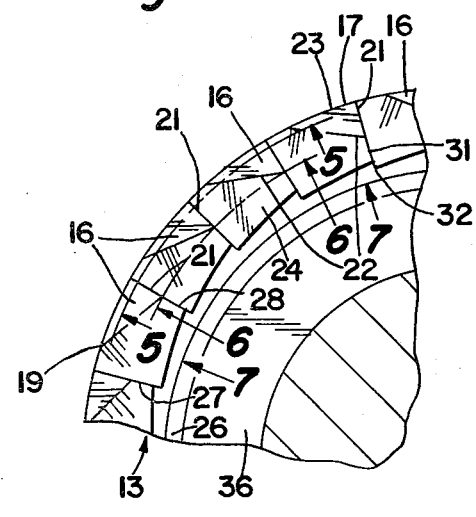
Fig. 4

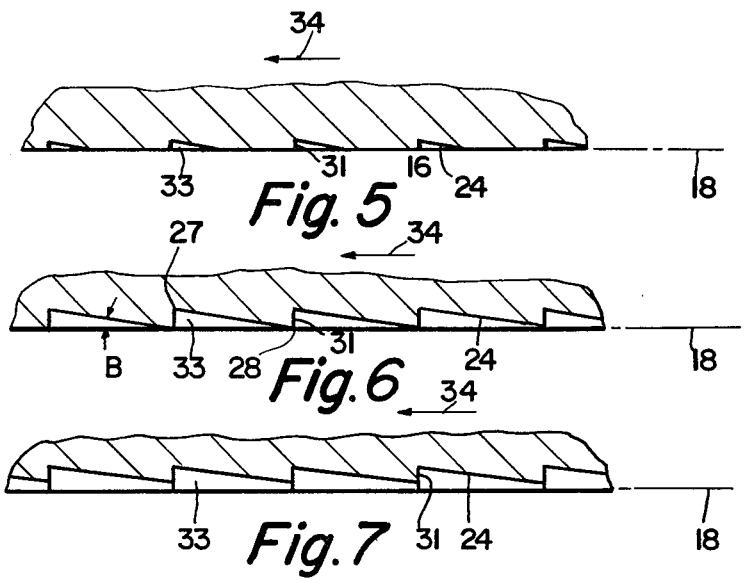
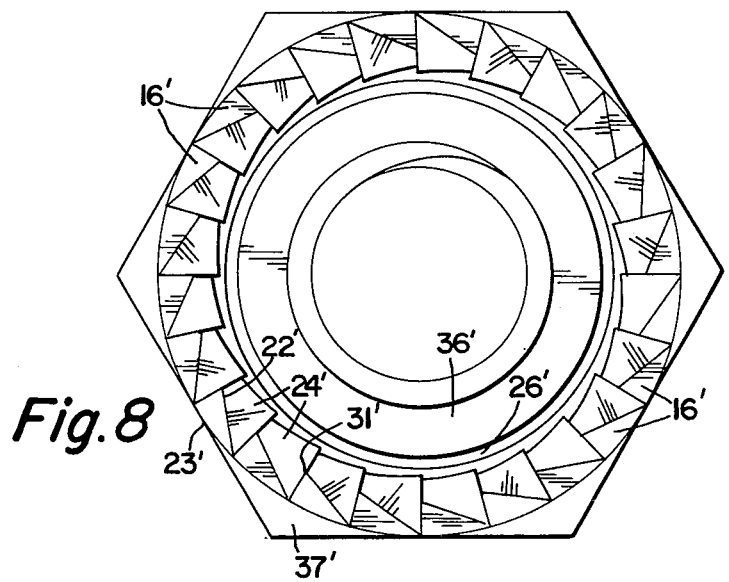
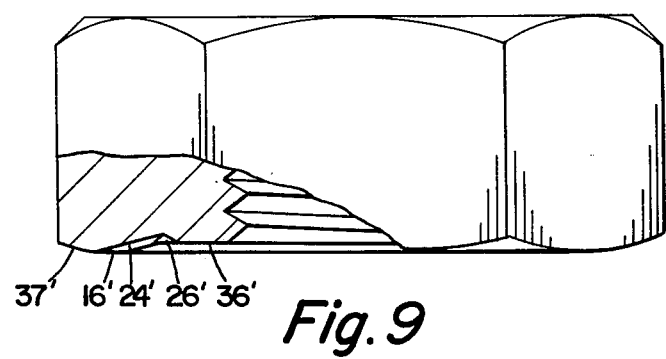

LOCKING FASTENER

BACKGROUND OF THE INVENTION

This invention relates generally to self locking threaded fasteners and more particularly to a novel and improved locking structure suitable for bolts, screws and nuts.

PRIOR ART

Threaded fasteners are generally used to secure or clamp two or more parts together. When functioning in such manner, the fasteners are provided with a load bearing or clamping surface which engages a surface on one part and exerts a clamping force in the direction of the length of the fasteners. (As used herein, the term "threaded fastener" is intended to encompass various types of such fasteners, as for example screws, nuts and bolts).

Such fasteners are often provided with locking means to resist unintentional loosening. One general class of self locking fastener provides, in addition to the bearing surface, a plurality of saw tooth shaped projections which cut or otherwise embed themselves into the mating part to lock the fastener in its tightened position and to resist unintentional loosening.

Examples of such general class of self locking fasteners are described in U.S. Pat. Nos. 1,332,288, 1,106,248, 2,253,241, 2,741,289, 2,959,204, 3,078,899, 3,275,055, 3,329,190, 3,342,235, 3,370,631, 3,389,734, 3,438,417, 3,605,845, and 3,825,051.

In the U.S. Pat. No. 2,959,204, assigned to the assignee of the present invention, the toothlike projections extend below the bearing surface and are shaped to provide less resistance to tightening rotation of the fastener while providing greater resistance to loosening rotation of the fastener. When the bearing surface tooth relationship is arranged as described in such patent, high clamping forces can be obtained and the loosening torque required to commence loosening of the fastener exceeds the torque required to tighten and set the fastener. Such types of self locking structures tend to abrade portions of the clamped part and often tend to cause corrosion problems.

U.S. Pat. Nos. 3,605,845 and 3,825,051 describe a self locking fasteners in which the self locking tooth shaped structure does not project beyond the bearing surface and the material forming the mating part flows into the recesses between the teeth to provide the self locking function. Such patents provide outer bearing surfaces of substantial area which tend to limit the penetration of the teeth.

SUMMARY OF THE INVENTION

In accordance with the present invention a novel and improved self locking structure is provided for threaded fasteners. Such structure provides a plurality of bearing surfaces positioned in an annulus around the fastener. Each surface is oriented to provide a narrow end or apex in the direction of tightening rotation and a wider end or base in the direction of loosening rotation. The inner side edge of each bearing surface joins and blends with an inclined ramp surface which extends back from the plane of the bearing surface to a substantially axially extending shoulder which extends from the ramp surface to the base of an associated bearing surface. The associated shoulders and ramp surfaces cooperate to define a sawtooth like recess around the fastener.

As the locking surface is pressed against a clamped part by tightening the fastener, the bearing surfaces provide the initial engagement between the fastener and the part being clamped. As the clamping force increases, the bearing surfaces commence to displace material of the clamped part and cause it to move into the recesses between each of the bearing surfaces. Such displacement may result from cold flow, bending of the clamped material, or combinations of both. As this occurs, the displaced material progressively engages larger portions of the ramp surfaces with engagement along the ramp surfaces providing additional surface areas to assist the bearing surfaces in supporting the clamping loads. The inclined orientation of the ramp surfaces provides a camming or wedging action which allows increased tightening of the fastener without excessive increases in the tightening torques required. However, after the fastener is tightened, the material in the recesses and the shoulders cooperate to lock the fastener against loosening rotation. In practice, fasteners incorporating this invention can require a torque to commence loosening which can be as high as one and a half times the tightening torque. The structure provided by the present invention is arranged so that the size of the bearing surface can be selected to provide the proper penetration.

With the present invention the locking system provides three functioning surfaces namely the bearing surfaces, the ramp surfaces, and the locking shoulders. The relationship between such surfaces are easily changed or modified to provide optimum performance of the total system. For example, the bearing surfaces can be arranged so that the narrow end are spaced from the base of an adjacent bearing surface, as illustrated, or sized to intersect the adjacent base. Further the radial length of the ends of the bearing surfaces can be changed to modify the bearing area.

In a similar manner, the slope or inclination of the ramp surfaces can be modified to change their size and the size of the shoulders. Therefore, a self locking fastener in accordance with this invention can be easily produced to provide optimum performance under a wide variety of installation conditions.

BRIEF DESCRIPTION OF THE DRAWINGS

FIG. 1 is a side elevation of a typical flange screw on which the locking system in accordance with this invention is provided;

FIG. 2 is a cross section taken generally along 2—2 of FIG. 1 illustrating the arrangement of the locking surfaces on the lower face of the head of the screw;

FIG. 3 is an enlarged fragmentary section taken along 3—3 of FIG. 2 with only the first group of locking surfaces illustrated to simplify the drawing;

FIG. 4 is an enlarged fragmentary view similar to FIG. 2 illustrating the locking surfaces at increased scale;

FIG. 5 is a fragmentary view taken along 5—5 of FIG. 4;

FIG. 6 is a fragmentary section taken along 6—6 of FIG. 4;

FIG. 7 is a fragmentary section taken along 7—7 of FIG. 4;

FIG. 8 is an end view of a self locking nut in accordance with this invention and FIG. 9 is a side elevation partially in section of the nut illustrated in FIG. 8.

DETAILED DESCRIPTION OF THE DRAWINGS

FIGS. 1 through 7 illustrate a flange screw incorporating the self locking structure in accordance with the present invention. Such screw provides a head with a wrenching portion 10 of hexagonal shape and a flange portion 11. A threaded shank 12 extends from the head in the usual manner. A self locking structure is formed on the underside or head surface 13 of the head of the bolt. Such structure is illustrated in FIGS. 2 through 7. Referring to FIG. 2, in the illustrated embodiment the underside 13 of the flange 11 is formed with a plurality of generally triangular shaped bearing surfaces 16 which extend around the head surface 13 adjacent to the periphery at 17. All of the bearing surfaces 16, in the illustrated embodiment, are contained in a single plane 18. Each triangular bearing area is provided with a narrow end or apex at 19, a substantially radial wider end or base 21, and inner and outer sides 22 and 23, respectively. In the illustrated embodiment the outer side edge of each bearing surface 16 is an arc of the peripheral circle 17. Therefore, each bearing surface is not strictly speaking a triangle but for purposes of this specification it should be understood that the term "triangle" is to include surfaces which are generally triangular as illustrated.

Extending inwardly from the inner side edge 22 of each bearing surface is an associated ramp surface 24 which is inclined back from the plane 18 as described in greater detail below. Each inclined ramp surface 24 extends from the edge 22 to an annular groove 26 which in the illustrated embodiment is generally V-shaped in cross section as best illustrated in FIG. 3. Each ramp surface is bounded along one side at an edge 27 and along its opposite side by an edge 28, both of which extend substantially radially with respect to the bolt.

A shoulder 31 is provided between the base 21 of each bearing surface 16 and the side edge 27 of the associated ramp surface 24. In the illustrated embodiment, each of the shoulders 31 is contained substantially within the plane containing the axis 32 of the bolt. However, it is within the broader aspects of this invention to provide shoulders which are inclined to some extent, either radially or axially, or both.

As best illustrated in FIG. 3, the ramp surfaces 24 are inclined upwardly or back from the plane 18 by a radial angle A. Such ramp surfaces are also inclined in a peripheral direction as best illustrated in FIG. 6 by a tangential or peripheral angle B. The size of the angle B is determined by the angulation of the side edge 22 of the bearing surfaces 16 and if the angulation of such edge is increased, the angle B must be increased. Conversely, if the bearing surfaces 16 are provided with a narrower triangular shape in a peripheral direction, the angle B is decreased.

The angle B determines the depth of the shoulders 31 for a given radial angle A. It should also be understood that the shoulders 31 extend radially inwardly beyond the bearing surfaces to the points 32 where the groove 26 is intersected.

As the self locking bolt or screw incorporating the present invention is tightened against a mating surface of a member being clamped, the mating surface is first engaged by the bearing surfaces 16. As the clamping load increases during the torqueing of the bolt, sufficient pressure is developed on the mating surface to cause a displacement of the material forming such mating surface into the recesses 33 formed by the ramp surfaces 24 and the shoulders 31. As the clamping forces continue to increase, this displacement or cold flow of material further increases.

It should be noted that the displacement or cold flow of material into the recesses 33 causes the material to engage increasing portions of the ramp surfaces 24 so the ramp surface area engaged by the material provides in effect an additional bearing surface to support the clamping load. Consequently, the locking system tends to be self-limiting in its penetration into the mating surface and there is no tendency for the locking system to produce excessive cold flow or material displacement. Therefore, a given self-locking fastener can be effectively used in materials of varying hardnesses due to this self limiting feature of the locking system.

The tightening rotation of the bolt is in the direction of the arrow 34 in each of the FIGS. 5, 6, and 7. Consequently, the torque required to tighten the bolt is not excessively increased as the bolt clamping force causes displacement of the material forming the mating surface. However, as the material flows into the recesses 33, a locking action occurs between such material and the substantially axially extending shoulders 31 which resists loosening rotation of the bolt. Consequently, the loosening torque in a properly clamped installation exceeds the tightening torque, and in many instances can exceed the tightening torque by as much as one and a half times.

In the illustrated embodiment the angle A is preferably about six degrees, but may be varied to some extent. In such illustrated embodiment the angle B is about 5 degrees, but such angle may also be varied. To ensure that the clamping force is confined substantially entirely to the self locking system, the portions of the bolt head at 36 radially within the groove 26 are spaced back from the plane 18 so that they do not significantly engage the surface of the clamped part. On a 5/16"-18 screw, such surface 36 is spaced back from the plane 18 by about 0.006 inch.

In the embodiment illustrated in FIGS. 1 through 7, the bearing surfaces are spaced from each other and the total area of the bearing surfaces is relatively small. Consequently, proper locking penetration is obtained even when the screw is used with a relatively hard mating part. Further, since the height of the shoulder surfaces 31 at the periphery of the skirt is very small, moisture penetration and corrosion is not a significant problem. In fact, if the bearing surfaces penetrate to a depth equal to the peripherial depth of the shoulder, a full seal can be established because of the circular shape of the skirt, and moisture penetration is positively prevented.

It is also within the broader aspects of this invention, to arrange the surfaces so that the apices 19 intersect or just join the outer extremity of the next adjacent base 21. With such arrangement, a continuous seal or bearing surface is provided completely around the periphery 17 of the flange 11 and a full seal is provided completely around the bolt head. Further, because the periphery is circular, adjacent surfaces of the clamped part are not damaged, and the tendency for moisture to penetrate into the zone beneath the head of the fastener is virtually eliminated. Corrosion is therefore not a significant problem.

In such arrangement the three surfaces of the locking system, namely, the bearing surface 16, the ramp surfaces 24 and the shoulder surfaces 31 all intersect at the apices 19 of the associated bearing surface.

It is also within the broader aspects of this invention to arrange the bearing surfaces so that the side edges 22 and 23 do not converge to a point or apex. In such instance, the bearing surfaces are not triangular but are essentially irregular quadrilaterals having a narrow end of finite length.

FIGS. 8 and 9 illustrate a self locking nut in accordance with this invention. In such instance, the nut is hexagonal in shape but is provided with a self locking bearing system having a structure similar to the embodiment illustrated in FIGS. 1 through 7. Such embodiment can also be applied to a hexhead screw. Similar reference numerals will be used to designate similar parts with a prime (') added to designate reference to the second embodiment of FIGS. 8 and 9.

Here again, triangular bearing surfaces 16' are spaced around the nut. The nut is chamfered at 37' so that the bearing system is again provided with outer edges 23' which are segments of a circle. The inclined ramp surfaces 24' intersect the bearing surfaces 16' at 22' and shoulders 31'. Here again, the locking shoulders 31' and ramp surfaces 24' terminate in a V-shaped groove 26' and the surface 36' radially within the groove 26' is spaced back from the plane of the bearing surfaces. In this illustrated embodiment, the bearing surfaces are sized so that the apices 19' join the outer end of the base 21' of an adjacent bearing surface 16' so the bearing surfaces extend completely around the nut.

With a locking system in accordance with the present invention there is substantially no tendency for chips to be developed from the mating surface and the locking is achieved by displacement of the mating surface material into the recesses provided between the shoulders and the ramp surfaces. Because the ramp surfaces are engaged by the displaced material the effective bearing area of the locking system increases as displacement occurs to limit the tendencies for excessive penetration of the fastener into the mating part which is being clamped. Consequently a given fastener provided with a locking system in accordance with this invention can be used to clamp against surfaces of relatively wide ranges of hardness. When clamping against materials which are harder, a lesser penetration occurs but the bearing surfaces 16 are sufficiently small in area to ensure that some material displacement occurs. When used with two clamp materials which are softer, the flow of material causes rapid increases in the area of clamping so excessive displacement does not result.

Although preferred embodiments of this invention are illustrated, it should be understood that various modifications and rearrangements of parts may be resorted to without departing from the scope of the invention disclosed and claimed herein.

What is claimed is:

1. A threaded fastener comprising thread means, a load surface, and wrenching means permitting said fastener to be tightened and loosened, said load surface being adapted to be tightened against a substantially flat mating surface and providing self-locking means including:
   (a) a plurality of bearing surfaces symmetrically positioned around said thread means and substantially contained in a substantially flat and radial bearing plane, each bearing surface providing a narrow end in the direction of tightening rotation, a wider end in the direction of loosening rotation, a peripheral length and an inner side edge respectively joining the radially outer and inner extremities of said ends, said wider end of each bearing surface having a radial length which is substantially less than said peripheral length;
   (b) an inclined ramp surface extending inwardly from each of said inner side edges beyond the radially inner extremity of said wider end and back from said bearing plane;
   (c) radially and axially extending shoulders joining said wider end of said bearing surfaces and the adjacent end of said ramp surfaces, said shoulders extending radially inwardly a substantial distance beyond the radially inner extremity of said wider end, the height of said shoulders increasing in a radially inward direction to the radially inner extremity of said wider end and extending radially inwardly therebeyond with substantially uniform height and inclined back from said bearing plane;
   (d) said ramp surfaces and associated shoulders cooperating to define recesses symmetrically arranged around said thread means, tightening of said fastener against a mating surface causing said bearing surfaces to be pressed into said mating surface and causing the material forming said mating surface to be displaced past said bearing plane into said recesses adjacent to said shoulders so that a mechanical interference is established between said shoulders and the material of said mating surface displaced past said bearing plane to resist loosening of said fasteners, said ramp surfaces engaging the material displaced past said bearing plane while said fastener is being tightened and operating to provide a camming action allowing continued tightening of said fastener without encountering excessive torque, and the total area of said bearing surfaces being sufficiently small to allow them to penetrate into said mating surface without excessive torque, increased penetration of said bearing surfaces into said mating surface causing a progressively increasing length of said shoulders to penetrate into said mating surface without increasing the size of said bearing surface.

2. A threaded fastener as set forth in claim 1 wherein said bearing surfaces are generally triangular in shape positioned with apexes at said narrow ends and bases at said wider ends.

3. A threaded fastener as set forth in claim 2 wherein said bearing surfaces provide outer side edges which cooperate to provide a substantial portion of the periphery of said self-locking means, and said periphery is a circle coaxial with said thread means.

4. A threaded fastener as set forth in claim 3 wherein the apices of said bearing surfaces are spaced from the base of the next adjacent bearing surface.

5. A threaded fastener as set forth in claim 3 wherein said load surface is provided with an annular recess around said thread means, and said shoulders and ramp surfaces extend radially inward to and terminate at said annular recess.

6. A threaded fastener as set forth in claim 5 wherein said annular recess is radially spaced from said thread means, said load face being axially spaced back from said bearing plane between said annular recess and said thread means by an amount necessary to normally prevent contact with said mating surface at least until clamping load is reached.

7. A threaded fastener as set forth in claim 1 wherein said bearing surfaces cooperate to provide a continuous bearing surface around said thread means.

8. A threaded fastener as set forth in claim 7 wherein said bearing surfaces provide outer side edges which cooperate to provide a periphery of said self-locking means, and said periphery is a circle coaxial with said thread means.

9. A threaded fastener as set forth in claim 1 wherein said threaded fastener is a nut.

10. A threaded fastener as set forth in claim 1 wherein said thread fastener is a bolt or screw.

11. A threaded fastener as set forth in claim 1 wherein said ramp surfaces and said bearing plane define a radial angle of about 6 degrees.

12. A threaded fastener as set forth in claim 1 wherein said ramp surfaces and said bearing plane define a peripheral angle of about 5 degrees.

13. A threaded fastener as set forth in claim 12 wherein said ramp surfaces and said bearing plane define a radial angle of about 6 degrees.

14. A threaded fastener comprising thread means, a load surface, and wrenching means permitting such fastener to be tightened and loosened, said load surface being adapted to be tightened against a substantially flat mating surface, said load surface providing a plurality of substantially triangular bearing surfaces contained substantially in a single radial bearing plane, said bearing surfaces providing apices in the direction of tightening rotation, substantially radial bases in the direction of loosening rotation and inner side edges, said bearing surfaces having a radial width substantially less than their peripheral length, said load surfaces providing inclined intermediate ramp surfaces intersecting said side edges and inclined inwardly and back from said bearing plane to an edge joined to the associated base by an axially extending shoulder, each ramp surface and associated shoulder extending radially inwardly a substantial distance beyond the associated one of said radial bases, said shoulders having a height which gradually increases in a radially inward direction along the bases of the associated bearing surfaces and extends radially inwardly therebeyond with substantially uniform height and is inclined back from said bearing plane, said ramp surfaces and associated shoulders cooperating to define a recessed zone spaced back from said bearing plane, the total area of said bearing surfaces being sufficiently small so that on tightening they are pressed into the flat mating surface causing the material forming said mating surfaces to be displaced past said bearing plane into the said recessed zones adjacent to said shoulders along said bases and radially inward therebeyond so that a mechanical interference is established between said shoulders and the material of said mating surface displaced past said bearing plane to resist loosening of said fastener, increased penetration of said bearing surfaces into said mating surface causing a progressively increasing length of said shoulders to penetrate into said mating surface without increasing the size of said bearing surface.

15. A threaded fastener as set forth in claim 14 wherein said apices of said bearing surfaces are spaced from the base of an adjacent bearing surface.

16. A threaded fastener as set forth in claim 15 wherein the outer extremity of said bearing surfaces are portions of a circle substantial coaxial with said thread means.

* * * * *